United States Patent
Lee et al.

(10) Patent No.: US 10,216,421 B2
(45) Date of Patent: Feb. 26, 2019

(54) METHOD OF OPERATING STORAGE DEVICE USING SERIAL INTERFACE AND METHOD OF OPERATING DATA PROCESSING SYSTEM INCLUDING THE SAME

(71) Applicant: SAMSUNG ELECTRONICS CO., LTD., Suwon-si, Gyeonggi-do (KR)

(72) Inventors: Young Min Lee, Seoul (KR); Sung Ho Seo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 141 days.

(21) Appl. No.: 15/375,963

(22) Filed: Dec. 12, 2016

(65) Prior Publication Data

US 2017/0177219 A1    Jun. 22, 2017

(30) Foreign Application Priority Data

Dec. 18, 2015 (KR) .................. 10-2015-0181966

(51) Int. Cl.
| | | |
|---|---|---|
| G06F 9/00 | (2006.01) | |
| G06F 3/06 | (2006.01) | |
| G06F 12/02 | (2006.01) | |
| G06F 13/42 | (2006.01) | |
| G06F 9/4401 | (2018.01) | |

(52) U.S. Cl.
CPC ............ G06F 3/061 (2013.01); G06F 3/0659 (2013.01); G06F 3/0679 (2013.01); G06F 9/4418 (2013.01); G06F 12/0246 (2013.01); G06F 13/4282 (2013.01); *G06F 2212/7201* (2013.01); *Y02D 10/14* (2018.01); *Y02D 10/151* (2018.01)

(58) Field of Classification Search
CPC ...... G06F 3/061; G06F 3/0659; G06F 3/0679; G06F 9/4418; G06F 3/06; G06F 12/0246; G06F 13/4282; G06F 2212/7201; Y02D 10/14; Y02D 10/151
USPC .................. 711/105, 103; 713/103, 323, 300
See application file for complete search history.

(56) References Cited

U.S. PATENT DOCUMENTS

| | | | |
|---|---|---|---|
| 7,010,711 B2 | 3/2006 | Bashford et al. | |
| 7,330,989 B2 | 2/2008 | Bashford et al. | |
| 7,478,260 B2* | 1/2009 | Spencer | G06F 1/04 |
| | | | 713/320 |
| 7,657,687 B2* | 2/2010 | Ootsuka | G06F 13/405 |
| | | | 235/492 |
| 7,856,567 B2 | 12/2010 | Igari | |
| 7,895,457 B2* | 2/2011 | Luo | G06F 1/3203 |
| | | | 713/322 |
| 8,464,084 B2 | 6/2013 | Huffman et al. | |
| 8,615,671 B2 | 12/2013 | Robles et al. | |

(Continued)

FOREIGN PATENT DOCUMENTS

KR    1020150087668    7/2015

*Primary Examiner* — Aurel Prifti
(74) *Attorney, Agent, or Firm* — Volentine, Whitt & Francos, PLLC (57) ABSTRACT

A method of operating a storage device, which communicates with a host using a serial interface to reduce power consumption, includes counting fillers transmitted from a physical layer (PHY) transmission module of the host to generate a count value, comparing the count value with a reference value, and cutting off power to a PHY phase locked loop (PLL) circuit of the storage device according to a comparison result.

18 Claims, 8 Drawing Sheets

(56) References Cited

U.S. PATENT DOCUMENTS

| | | | |
|---|---|---|---|
| 8,621,128 B2 | 12/2013 | Radulescu et al. | |
| 8,959,374 B2 | 2/2015 | Miller et al. | |
| 2002/0039325 A1* | 4/2002 | Aizawa | G11C 16/32 365/233.1 |
| 2006/0149977 A1* | 7/2006 | Cooper | G06F 1/3215 713/300 |
| 2008/0189712 A1* | 8/2008 | Boris | G06F 9/5083 718/103 |
| 2009/0125735 A1* | 5/2009 | Zimmerman | G06F 1/3203 713/310 |
| 2009/0187779 A1* | 7/2009 | Liu | G06F 1/3221 713/323 |
| 2012/0017105 A1* | 1/2012 | Thyni | G06F 1/325 713/323 |
| 2012/0166831 A1* | 6/2012 | Shimoda | G06F 1/3237 713/320 |
| 2012/0182273 A1* | 7/2012 | Ninomiya | G06F 3/1431 345/204 |
| 2014/0281192 A1* | 9/2014 | Gilda | G06F 13/16 711/105 |
| 2015/0012671 A1 | 1/2015 | Park et al. | |
| 2015/0208378 A1 | 7/2015 | Kang et al. | |
| 2016/0070489 A1* | 3/2016 | Yoshimura | G06F 3/0619 711/103 |
| 2017/0063618 A1* | 3/2017 | Kumar | H04L 45/08 |
| 2017/0093526 A1* | 3/2017 | Mula | H04L 1/0045 |

\* cited by examiner

METHOD OF OPERATING STORAGE DEVICE USING SERIAL INTERFACE AND METHOD OF OPERATING DATA PROCESSING SYSTEM INCLUDING THE SAME

CROSS-REFERENCE TO RELATED APPLICATION

This application claims priority under 35 U.S.C. § 119(a) from Korean Patent Application No. 10-2015-0181966 filed on Dec. 18, 2015, the disclosure of which is hereby incorporated by reference in its entirety.

BACKGROUND

Embodiments of the disclosure relate to a method of operating a storage device using a serial interface, and more particularly, to a method of operating a storage device which communicates with a host through a mobile industry processor interface (MIPI) M-PHY® layer and a MIPI Uni-Pro$^{SM}$ link layer defined in the MIPI standard and to a method of operating a data processing system including the storage device.

MIPI is a standard for hardware and software interface between a mobile processor and peripheral devices. MIPI M-PHY® supports a high-speed mode and a low-speed mode according to a data transfer rate. The high-speed mode is advantageous in terms of performance but has a disadvantage of large power consumption. In the high-speed mode, power consumption in an active state where real data is transmitted is the same as power consumption in an idle state where a dummy pattern (e.g., filler) is transmitted.

SUMMARY

According to some embodiments of the disclosure, there is provided a method of operating a storage device which communicates with a host using a serial interface. The method includes counting dummy patterns transmitted from a physical layer (PHY) transmission module of the host to generate a count value, comparing the count value with a reference value, and cutting off power to a PHY phase locked loop (PLL) circuit of the storage device according to a comparison result.

According to other embodiments of the disclosure, there is provided a method of operating a data processing system including a host and a storage device which communicate with each other using a serial interface. The method includes the host sending dummy patterns to the storage device; the storage device counting the dummy patterns to generate a count value; the storage device comparing the count value with a reference value; and the storage device cutting off power to a PHY PLL circuit of the storage device according to a comparison result.

According to other embodiments of the disclosure, there is provided a method executed by a nonvolatile memory storage device that communicates with a host using a serial interface. The method includes determining, in a first determination, whether the host has acknowledged a response from the storage device pertaining to a last command received from the host and determining, in a second determination, whether the host has no further command to communicate to the storage device. Power to a phase-locked loop circuit of a physical-layer (PHY) transmission module of the storage device is withdrawn when both the first and second determinations are affirmative.

BRIEF DESCRIPTION OF THE DRAWINGS

The above and other features and advantages of the disclosure will become more apparent by describing in detail exemplary embodiments thereof with reference to the attached drawings in which.

DETAILED DESCRIPTION OF THE EMBODIMENTS

The disclosure now will be described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

The standards defined by the mobile industry processor interface (MIPI) alliance are hereby incorporated by reference in their entirety. In detail, the MIPI M-PHY® version 3.0 specification and the MIPI UniPro version 1.6 specification are hereby incorporated by reference. The terms and definitions used herein have the same meanings as those described in these specifications.

Figure 1:
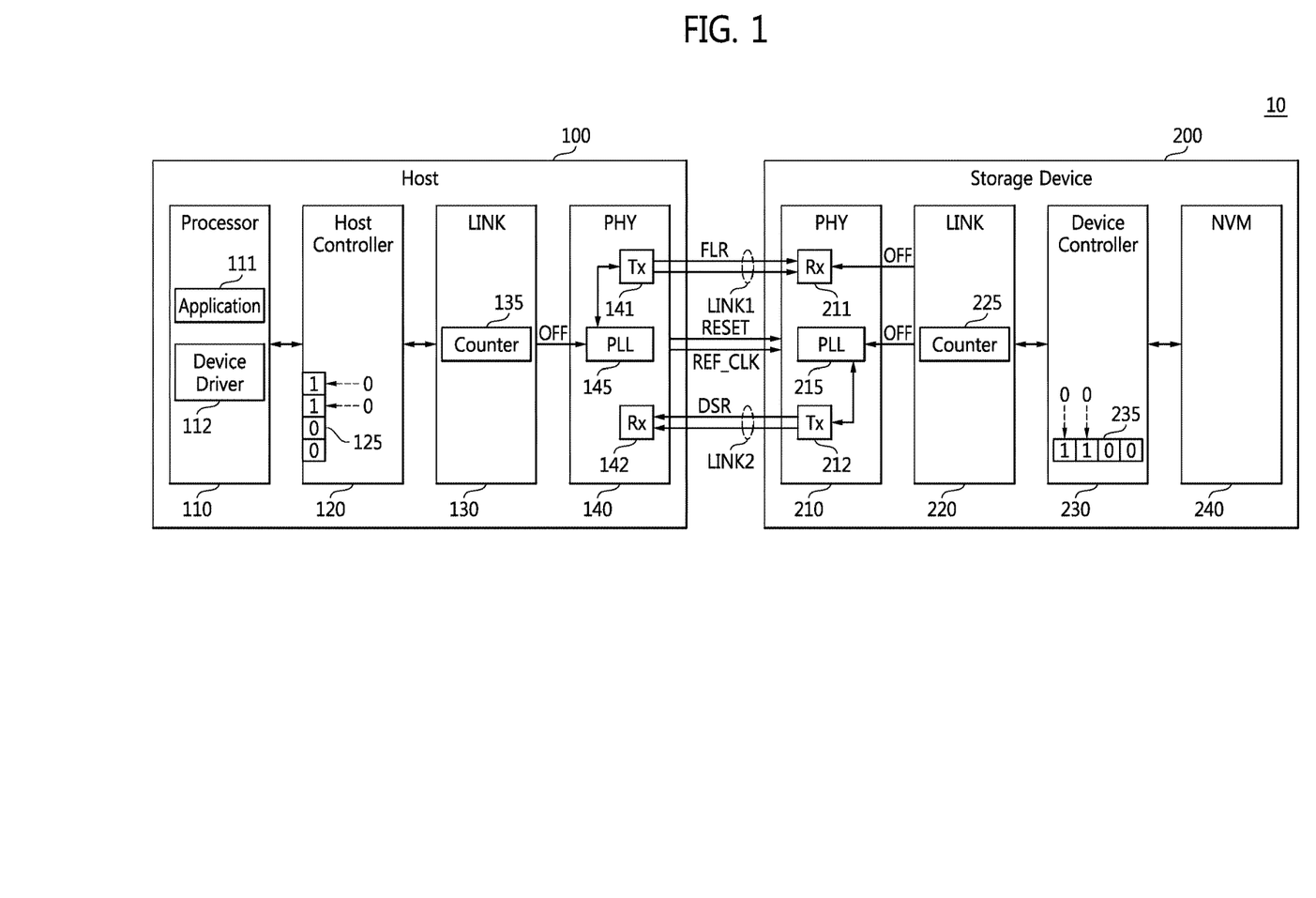
FIG. 1 is a block diagram of a data processing system according to some embodiments of the disclosure.

FIG. 1 is a block diagram of a data processing system 10 according to some embodiments of the disclosure. The data processing system 10 may include a host 100 and a storage device 200 which are connected with each other through a serial interface. The data processing system 10 may be implemented as a personal computer (PC), a workstation, a data center, an internet data center (IDC), a direct attached storage (DAS), a storage area network (SAN), a network-attached storage (NAS), or a mobile device, but the disclosure is not restricted to these examples. The mobile device may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book.

The serial interface may be a serial advanced technology attachment (SATA) interface, serial attached SCSI (small computer system interface) (SAS), peripheral component interconnect express (PCIe) interface, non-volatile memory express (NVMe) interface, or universal flash storage (UFS) interface but is not restricted thereto. The serial interface may refer to including a link layer, a physical layer, and wires connected among and between physical layers.

The host 100 may include a processor 110, a host controller 120, a link layer (LINK) 130, and a physical layer (PHY) 140. The LINK 130 and the PHY 140 may be called herein a device interface.

The processor 110 may be implemented as a multi-core processor. The multi-core processor is a single computing component with two or more independent actual processors (referred to as cores). Each of the processors reads and executes program instructions.

The processor 110 may drive an application 111 and a device driver 112. The application 111 may refer to application programs executed in the host 100. The device driver 112 is used to drive peripheral devices connected to the host 100. In the embodiments illustrated in FIG. 1, the device driver 112 may drive the storage device 200. The application 111 and the device driver 112 may be implemented in software or firmware.

The host controller 120 may control the overall operation of the host 100. For instance, when the host controller 120 receives a write request from the device driver 112, the host controller 120 may transmit data stored in buffer memory to the storage device 200 through the device interface.

When the host controller 120 receives a read request from the device driver 112, the host controller 120 may transmit a read command to the storage device 200 through the device interface and may receive data corresponding to the read command from the storage device 200. The host controller 120 may include a set of registers. The set of registers may be used as a command queue 125 which stores commands received from the device driver 112.

The LINK 130 may transmit and receive signals according to a predetermined rule (e.g., a communication protocol). For instance, the LINK 130 may transmit and receive signals according to a communication protocol defined in the MIPI UniPro version 1.6 specification. The LINK 130 may include a counter 135 which counts dummy patterns which are not real data and are transmitted from the storage device 200. A dummy pattern may be a filler FLR defined in the MIPI M-PHY® version 3.0 specification. The filler FLR may be a symbol which is transmitted in a period while valid data is not transmitted when the PHY 140 is in a burst state. The filler FLR may have a predetermined pattern of ten bits, e.g., 0011110010. The host 100 and the storage device 200 may communicate the filler FLR with each other and may find a communication cycle and identify data using the filler FLR.

The LINK 130 may manage power supply to the PHY 140 according to the control of the host controller 120. For instance, the LINK 130 may cut off power supplied to a PHY phase locked loop (PLL) circuit 145 included in the PHY 140.

The PHY 140 may transmit and receive signals according to a predetermined rule (e.g., a communication protocol). For instance, the PHY 140 may transmit and receive signals according to a communication protocol defined in the MIPI M-PHY® version 3.0 specification. The PHY 140 may include a PHY transmission module 141, a PHY receiving module 142, and the PHY PLL circuit 145.

The PHY transmission module 141 may transmit a signal to the storage device 200 through a first output terminal and a second output terminal. Lines connected to the first and second output terminals are referred to as a first link LINK1. The first link LINK1 may be controlled in one of at least three states: a positive state (DIF_P); a negative state (DIF_N); and a ground state (DIF_Z).

When a signal level (e.g., a voltage level) output from the first output terminal is higher than that output from the second output terminal, the first link LINK1 may be in the DIF_P. When the signal level output from the first output terminal is lower than that output from the second output terminal, the first link LINK1 may be in the DIF_N. When the signal level output from the first output terminal is equal to that output from the second output terminal, the first link LINK1 may be in the DIF_Z.

The PHY receiving module 142 may receive a signal from the storage device 200 through a first input terminal and a second input terminal. Lines involved with the first and second input terminals are referred to as a second link LINK2. The second link LINK1 may be controlled in one of at least three states: DIF_P; DIF_N; and DIF_Z.

When a signal level (e.g., a voltage level) input to the first input terminal is higher than that input to the second input terminal, the second link LINK2 may be in the DIF_P. When the signal level input to the first input terminal is lower than that input to the second input terminal, the second link LINK2 may be in the DIF_N. When the signal level input to the first input terminal is equal to that input to the second input terminal, the second link LINK2 may be in the DIF_Z.

The PHY PLL circuit 145 may generate a clock signal required according to a data transfer rate of the PHY 140 using a reference clock signal. The clock signal generated by the PHY PLL circuit 145 may be provided for the PHY transmission module 141.

The storage device 200 may be implemented as flash based storage, but the disclosure is not restricted to the current embodiments. The storage device 200 may be a solid-state drive or solid-state disk (SSD), an embedded SSD (eSSD), a UFS, a multimedia card (MMC), an embedded MMC (eMMC), or managed NAND, but it is not restricted to these examples.

The storage device 200 may include a PHY 210, a LINK 220, a device controller 230, and a non-volatile memory (NVM) 240. The PHY 210 and the LINK 220 may be referred to as host interface.

The PHY 210 may transmit and receive signals according to a predetermined rule (e.g., a communication protocol). For instance, the PHY 210 may transmit and receive signals according to a communication protocol defined in the MIPI M-PHY® version 3.0 specification. The PHY 210 may include a PHY receiving module 211, a PHY transmission module 212, and a PHY PLL circuit 215.

The PHY receiving module 211 may be connected with the PHY transmission module 141 through the first link LINK1 and may receive signals from the host 100.

The PHY transmission module 212 may be connected with the PHY receiving module 142 through the second link LINK2 and may transmit signals to the host 100. The operations of the PHY receiving module 211, the PHY transmission module 212, and the PHY PLL circuit 215 are the same as or similar to those of the PHY receiving module 142, the PHY transmission module 141, and the PHY PLL circuit 145, and therefore, the detailed description thereof will be omitted.

The LINK 220 may transmit and receive signals according to a predetermined rule (e.g., a communication protocol). For instance, the LINK 220 may transmit and receive signals according to a communication protocol defined in the MIPI UniPro version 1.6 specification. The LINK 220 may include a counter 225 which counts dummy patterns which are not real data and are transmitted from the host 100. A dummy pattern may be a filler FLR defined in the MIPI M-PHY® version 3.0 specification. The LINK 220 may manage power supplied to the PHY 210 according to the control of the device controller 230. For instance, the LINK 220 may cut off power supplied to the PHY PLL circuit 215 included in the PHY 210.

The device controller 230 may control the overall operation of the storage device 200. For instance, when the device controller 230 receives a write request from the host 100, it may store corresponding data in the NVM 240. When the device controller 230 receives a read request from the host 100, it may read corresponding data from the NVM 240 and transmit the data to the host 100. The device controller 230 may include a set of registers. The set of registers may be used as a command queue 235 which stores commands received from the host 100.

The NVM 240 may include a memory cell array and a control circuit which controls the operation of the memory cell array. The memory cell array may be a two-dimensional memory cell array or a three-dimensional memory cell array. The two-dimensional or three-dimensional memory cell array may include a plurality of memory cells. Each of the memory cells may store information of one bit or at least two bits.

Figure 2:
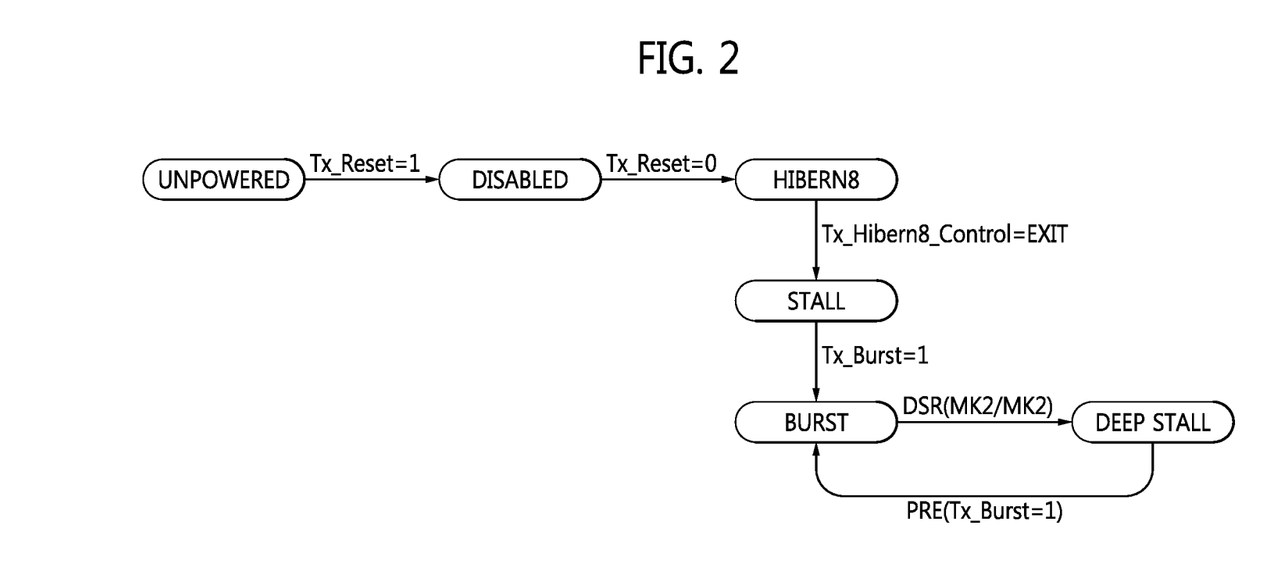
FIG. 2 is a status diagram showing the change in an operation state of physical layer (PHY) transmission modules illustrated in FIG. 1.

FIG. 2 is a status diagram showing the change in an operation state of the PHY transmission modules 141 and 212 illustrated in FIG. 1. Referring to FIGS. 1 and 2, the PHYs 140 and 210 may support a high-speed (HS) mode and a low-speed (LS) mode according to a data transfer rate. In the HS mode, the PHY transmission modules 141 and 212 may have six operation states: UNPOWERED, DISABLED, HIBERN8, STALL, BURST, and DEEP STALL.

The UNPOWERED state may be a state where power is not supplied to the PHY transmission modules 141 and 212. When power is supplied to the PHY transmission modules 141 and 212 and a Tx_Reset value is 1, the PHY transmission modules 141 and 212 may transit to the DISABLED state.

The DISABLED state may be a state where the PHY transmission modules 141 and 212 are being reset after being powered. In other words, all setting values involved in the operations of the PHY transmission modules 141 and 212 may be initialized in the DISABLED state. When the Tx_Reset value is 0 after the reset is completed, the PHY transmission modules 141 and 212 may transit to the HIBERN8 state.

The HIBERN8 state may be a state where minimum power is consumed with the current setting values involved in the operation of the PHY transmission modules 141 and 212 maintained. When a TX_ HIBERN8_Control value is EXIT in the HIBERN8 state, the PHY transmission modules 141 and 212 may transit to the STALL state.

The STALL state may be a state where the PHY transmission modules 141 and 212 may be on standby before transmitting data. When a Tx_Burst value is 1 in the STALL state, the PHY transmission modules 141 and 212 may transmit the BURST state.

The BURST state may be a state where the PHY transmission modules 141 and 212 are transmitting data and/or the filler FLR. The data may include various commands, responses, requests, write data, and read data transferred between the host 100 and the storage device 200. The filler FLR is not data containing information but a symbol having a predetermined pattern. The filler FLR may be transmitted in an idle period while no data is transmitted. After data transmission between the host 100 and the storage device 200 is completed, the PHY transmission modules 141 and 212 may transit to the DEEP STALL state. In other words, when only filler FLR is transmitted between the host 100 and the storage device 200 after all data has been transmitted, the PHY transmission modules 141 and 212 may send a deep stall request DSR requesting to stop transmission of the filler FLR and may transit to the DEEP STALL state.

The deep stall request DSR may be carried out by consecutively transmitting an MK2 data pattern defined in the UniPro$^{SM}$ version 1.6 specification a plurality of times (e.g., two times). The DEEP STALL state may be a state where the PHY transmission modules 141 and 212 are waiting for next data transmission without transmitting data and the filler FLR. In the DEEP STALL state, power to the PHY PLL circuits 145 and 215 may be cut off. Accordingly, power consumption of the host 100 and the storage device 200 may rapidly decrease in the DEEP STALL state. When the Tx_Burst value is 1 in the DEEP STALL state, the PHY transmission modules 141 and 212 may transit to the BURST state.

Figure 3:
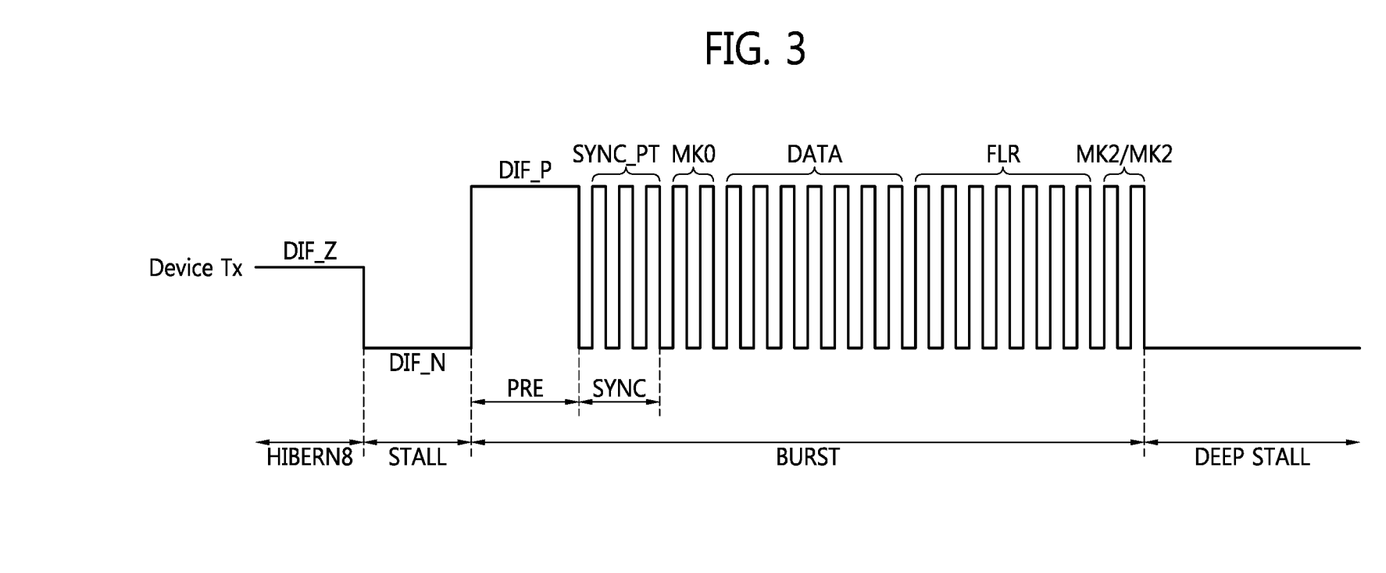
FIG. 3 is a waveform diagram showing the change in signals output from the PHY transmission modules illustrated in FIG. 1.

FIG. 3 is a waveform diagram showing the change in signals output from the PHY transmission modules 141 and 212 illustrated in FIG. 1. Referring to FIGS. 1 and 3, the PHY transmission module 212 may output a DIF_Z in the HIBERN8 state. When the PHY transmission module 212 transits from the HIBERN8 state to the STALL state, it may output a DIF_N and may stay in the DIF_N for a predetermined period of time. The PHY receiving module 142 may enter the STALL state when receiving the DIF_N. The PHY transmission module 212 may enter the BURST state and may perform preparation PRE for data transmission and synchronization SYNC. The PHY transmission module 212 may maintain an output at the DIF_P during the preparation PRE. The PHY receiving module 142 may receive the DIF_P and enter the BURST state. Thereafter, the PHY transmission module 212 may output a sync data pattern SYNC_PT for synchronization with the PHY receiving module 142.

After the synchronization SYNC is completed, the PHY transmission module 212 may transmit a control symbol (e.g., MK0) indicating data transmission start and data DATA to the PHY receiving module 142. After all the data is transmitted, the PHY transmission module 212 may transmit fillers FLR to the PHY receiving module 142. After transmitting the filler FLR for a predetermined period of time, the PHY transmission module 212 may transmit the deep stall request DSR to the PHY receiving module 142 to terminate the BURST state and enter the DEEP STALL state. The deep stall request DSR may be carried out by consecutively transmitting an MK2 data pattern defined in the UniPro™ version 1.6 specification a plurality of times (e.g., two times). The PHY transmission module 212 may output the DIF_N to the PHY receiving module 142 in the DEEP STALL state.

Figure 4:
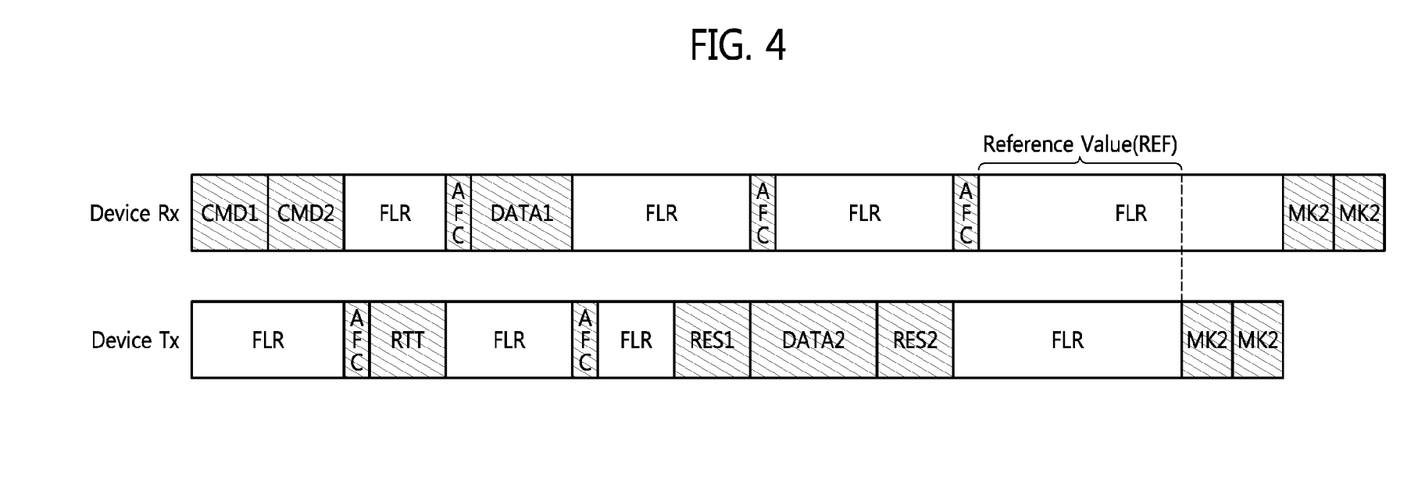
FIG. 4 is a timing chart showing the transition from a burst state to a deep stall state during a write operation and a read operation of a storage device illustrated in FIG. 1.
Figure 5:
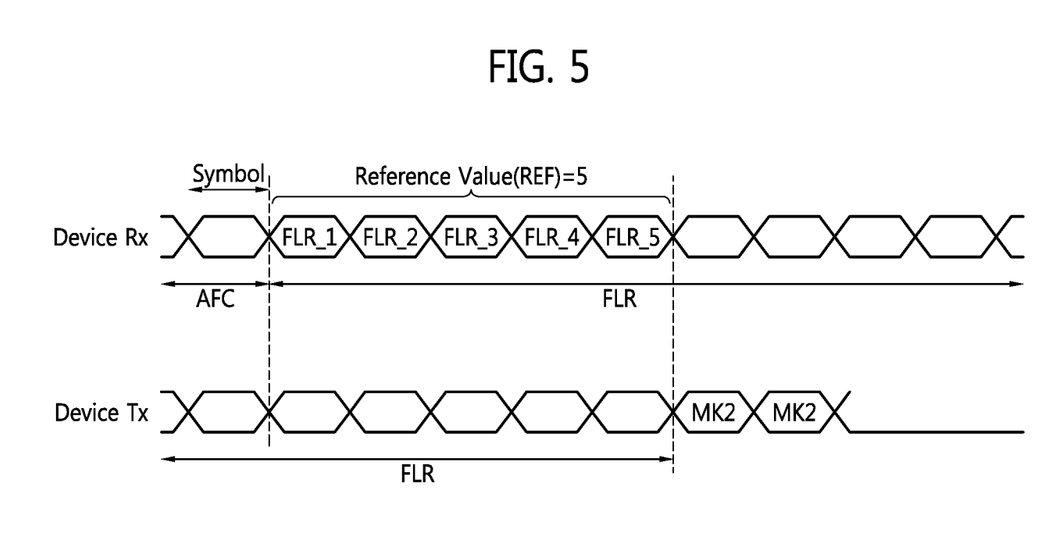
FIG. 5 is a timing chart showing a filler count method according to some embodiments of the disclosure.

FIG. 4 is a timing chart showing the transition from the BURST state to the DEEP STALL state during a write operation and a read operation of the storage device 200 illustrated in FIG. 1. FIG. 5 is a timing chart showing a filler count method according to some embodiments of the disclosure.

Referring to FIGS. 1, 2, and 4, the host 100 may transmit a first command CMD1 and a second command CMD2 to the storage device 200 through the PHY transmission module 141. It is assumed that the first command CMD1 is a write command and the second command CMD2 is a read command.

The PHY receiving module 211 in the storage device 200 may receive the first and second commands CMD1 and CMD2 from the host 100 in the BURST state. The LINK 220 may send an acknowledgement AFC, indicating that the first and second commands CMD1 and CMD2 have been normally received, to the host 100 through the PHY transmission module 212.

The first and second commands CMD1 and CMD2 may be transmitted to the device controller 230 through the LINK 220. The device controller 230 may store the commands CMD1 and CMD2 in the command queue 235 and may change a flag corresponding to each command from logic 0 to logic 1. The device controller 230 may assign buffer memory for temporarily storing first data DATA1 and may send a preparation response RTT indicating that preparation for data transmission is completed to the host 100 through the PHY transmission module 212. The host controller 120 may transmit an acknowledgement AFC of the preparation response RTT and the first data DATA1 to the storage device 200 through the PHY transmission module 141.

The PHY receiving module 211 may receive the acknowledgement AFC of the preparation response RTT and the first data DATA1 from the host 100. The LINK 220 may send an acknowledgement AFC, indicating that the first data DATA1 has been normally received, to the host 100 through the PHY transmission module 212. The first data DATA1 may be temporarily stored in the buffer memory through the LINK 220. The device controller 230 may store the first data DATA1 that has been temporarily stored in the buffer memory in the NVM 240 based on address mapping information of a flash translation layer. The device controller 230 may complete data processing corresponding to the first command CMD1 and may send a first completion response RES1 to the host 100 through the PHY transmission module 212.

The host controller 120 may inform the device driver 112 of the completion of the data processing corresponding to the first command CMD1 based on the first completion response RES1, may send an acknowledgement AFC of the first completion response RES1 to the storage device 200, and may terminate the operation corresponding to the first command CMD1. The PHY receiving module 211 may receive the acknowledgement AFC of the first completion response RES1 from the host 100. Upon receiving the acknowledgement AFC of the first completion response RES1 from the host 100, the device controller 230 may change the flag corresponding to the first command CMD1 from logic 1 to logic 0.

The device controller 230 may read second data DATA2 corresponding to the second command CMD2 based on the address mapping information of the flash translation layer. The device controller 230 may transmit the second data DATA2 and a second completion response RES2 indicating completion of data processing corresponding to the second command CMD2 to the host 100 through the PHY transmission module 212.

The host controller 120 may inform the device driver 112 of the completion of the data processing corresponding to the second command CMD2 based on the second completion response RES2, may send an acknowledgement AFC of the second completion response RES2 to the storage device 200, and may terminate the operation corresponding to the second command CMD2. The PHY receiving module 211 may receive the acknowledgement AFC of the second completion response RES2 from the host 100. Upon receiving the acknowledgement AFC of the second completion response RES2 from the host 100, the device controller 230 may change the flag corresponding to the second command CMD2 from logic 1 to logic 0.

When receiving the acknowledgement AFC of the second completion response RES2 from the host 100, the device controller 230 may determine whether a process corresponding to the last command from the host 100 has been completed. In detail, the device controller 230 may determine whether the process corresponding to the last command from the host 100 has been completed based on a bit value of each flag stored in the command queue 235. In other words, when the bit value of every flag is logic 0, the device controller 230 may determine that the process corresponding to the last command from the host 100 has been completed. The device controller 230 may also determine whether there is any command to be executed based on the command queue 235. In other words, when the command queue 235 is empty, the device controller 230 may determine that there is no command to be executed any more.

After receiving the acknowledgement AFC of the second completion response RES2, the PHY receiving module 211 may continuously receive fillers FLR from the PHY transmission module 141. In other words, until receiving another command after the data processing corresponding to the second command CMD2 is completed, the PHY transmission module 141 and the PHY receiving module 211 may stay at the BURST state and may transmit and receive the fillers FLR. When an idle state where only the fillers FLR are transmitted without data transmission lasts for a predetermined period of time, the LINK 220 in the storage device 200 may send the deep stall request DSR to the host 100 through the PHY transmission module 212 and may terminate the BURST state.

Referring to FIG. 5, the counter 225 of the LINK 220 may count the fillers FLR transmitted from the host 100 after receiving the acknowledgement AFC of the second completion response RES2 and may generate a count value. The counter 225 may compare the count value with a reference value REF. When the count value is equal to or greater than the reference value REF, the counter 225 may send the deep stall request DSR to the host 100 through the PHY transmission module 212. For instance, the reference value REF may be set to 5. The counter 225 may count fillers FLR_1 through FLR_5 received from the PHY receiving module 211 in the storage device 200. When the fifth filler FLR_5 is counted, the counter 225 may send the deep stall request DSR to the host 100.

The deep stall request DSR may be carried out by consecutively transmitting an MK2 data pattern defined in the UniPro$^{SM}$ version 1.6 specification a plurality of times (e.g., two times). After transmitting the deep stall request DSR, the PHY transmission module 212 in the storage device 200 may terminate the BURST state and enter the DEEP STALL state.

The LINK 130 in the host 100 may send an acknowledgement of the deep stall request DSR to the storage device 200 through the PHY transmission module 141. Like the deep stall request DSR, the acknowledgement of the deep stall request DSR may be carried out by consecutively transmitting the MK2 data pattern defined in the UniPro$^{SM}$ version 1.6 specification a plurality of times (e.g., two times). After transmitting the acknowledgement of the deep stall request DSR, the PHY transmission module 141 in the host 100 may terminate the BURST state and enter the DEEP STALL state.

Figure 6A:
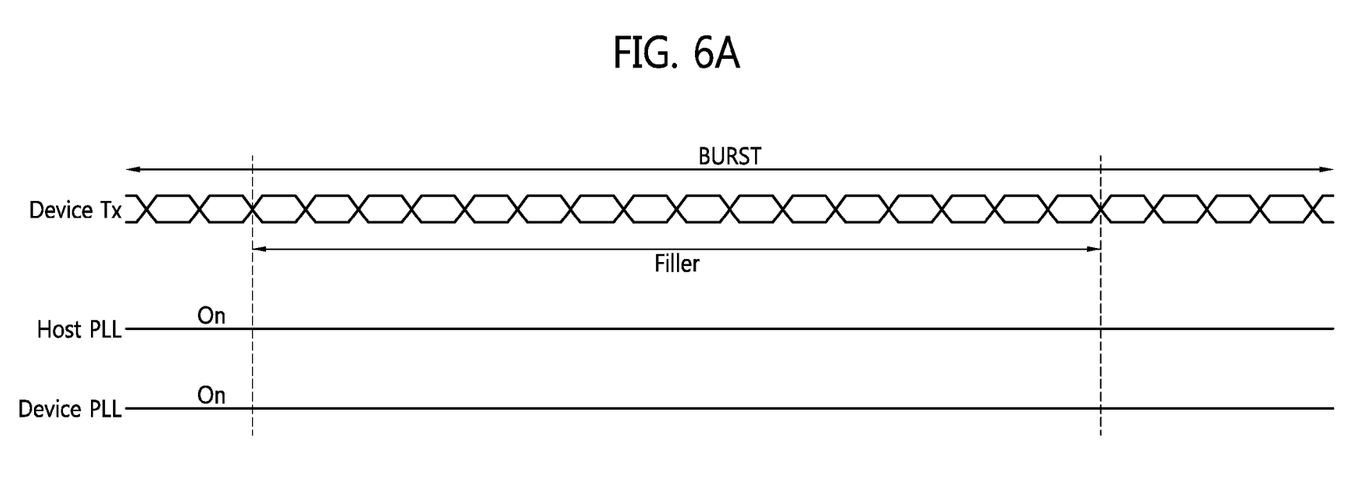
FIG. 6A is a timing chart showing power consumption when the burst state lasts continuously.
Figure 6B:
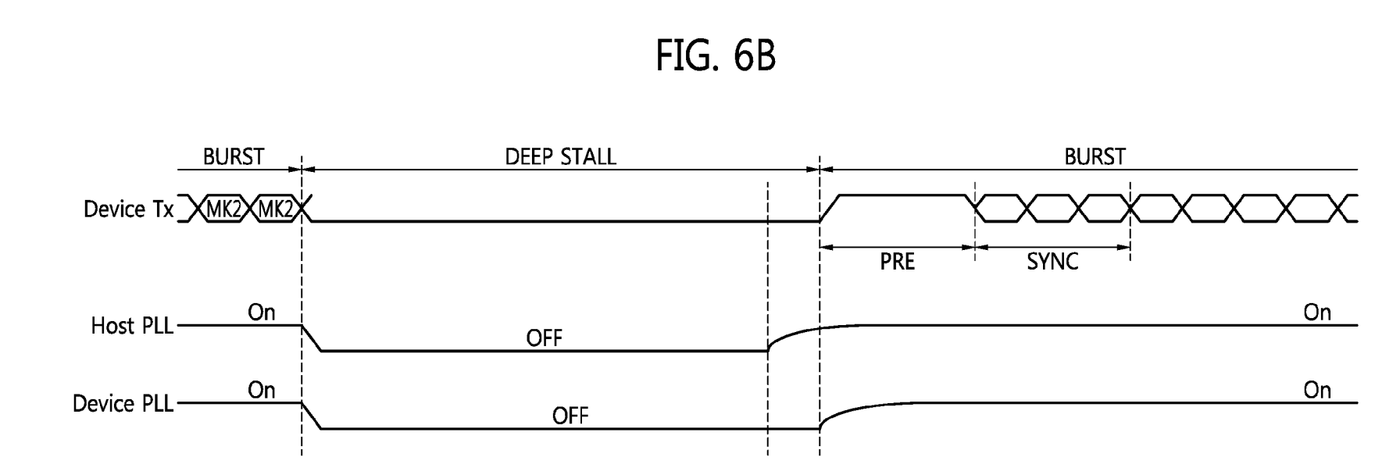
FIG. 6B is a timing chart showing power consumption when there is a transition from the burst state to the deep stall state.

FIG. 6A is a timing chart showing power consumption when the BURST state lasts continuously. FIG. 6B is a timing chart showing power consumption when there is transition from the BURST state to the DEEP STALL state.

Referring to FIGS. 5 and 6A, when the PHY transmission module 212 continuously maintains the BURST state without transmitting the deep stall request DSR to the PHY receiving module 142, the PHY PLL circuit 145 in the host 100 and the PHY PLL circuit 215 in the storage device 200 continuously consume power. In other words, despite the fact that there is no data to be transferred between the host 100 and the storage device 200, the host 100 and the storage device 200 consume unnecessary power to transmit the fillers FLR which is not real data. In particular, the greater the time gap of data transmission between the host 100 and the storage device 200, the more power is wasted.

Referring to FIGS. 5 and 6B, when the PHY transmission module 212 transmits the deep stall request DSR to the PHY receiving module 142, power supply to the PHY PLL circuit 145 in the host 100 and to the PHY PLL circuit 215 in the storage device 200 may be cut off. In detail, after the LINK 220 in the storage device 200 sends the deep stall request DSR to the PHY receiving module 142, it may cut off the power to the PHY PLL circuit 215. The LINK 220 in the host 100 may also cut off the power to the PHY PLL circuit 145 after sending the acknowledgement of the deep stall request DSR to the PHY receiving module 211. Accordingly, the host 100 and the storage device 200 minimize power consumption in the idle state where no data is transferred there between.

Figure 7:
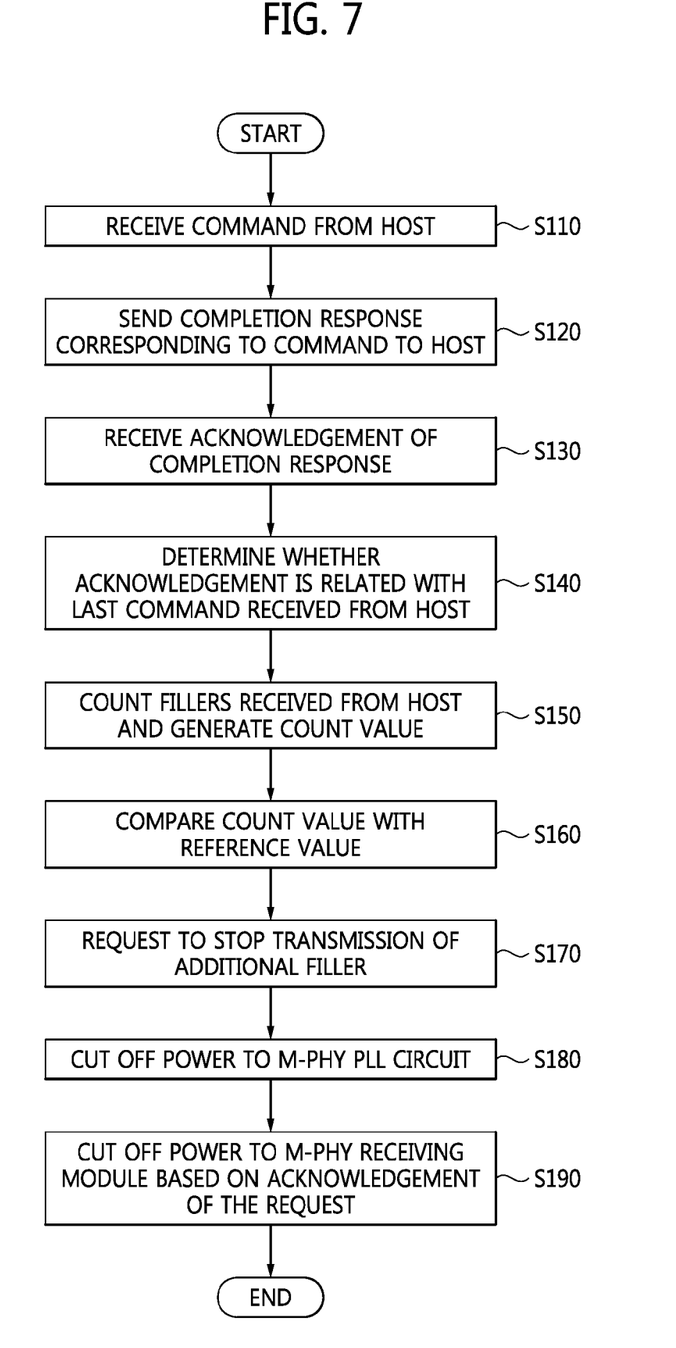
FIG. 7 is a flowchart of a method of operating a storage device according to some embodiments of the disclosure.

FIG. 7 is a flowchart of a method of operating the storage device 200 according to some embodiments of the disclosure. Referring to FIGS. 1, 2, 4, 5, and 7, the storage device 200 may transmit data to and receive data from the host 100 using the serial interface.

The device controller 230 may receive a command from the host 100 through the first link LINK1 in operation S110. For instance, the device controller 230 may receive the first command (e.g., write command) CMD1 and the second command (e.g., read command) CMD2 from the host 100. The commands CMD1 and CMD2 may be transmitted to the device controller 230 through the PHY 210 and the LINK 220. The device controller 230 may store the commands CMD1 and CMD2 in the command queue 235. When the commands CMD1 and CMD2 are stored in the command queue 235, the device controller 230 may change the flags corresponding to the respective commands CMD1 and CMD2 from logic 0 to logic 1.

The device controller 230 may complete data processing corresponding to the command and send a completion response to the host 100 through the second link LINK2 in operation S120. For instance, the device controller 230 may receive the first data DATA1 corresponding to the first command CMD1 from the host 100, may write the first data DATA1 to the NVM 240, and may send the first completion response RES1 indicating completion of the write operation to the host 100. The device controller 230 may also read the second data DATA2 from the NVM 240 in response to the second command CMD2 and may transmit the second data DATA2 and the second completion response RES2 indicating completion of the read operation to the host 100.

The device controller 230 may receive an acknowledgement of the completion response from the host 100 in operation S130 and may determine whether the acknowledgement is related with the last command that has been received from the host 100 in operation S140. Upon receiving the acknowledgement of the completion response from the host 100, the device controller 230 may delete the command from the command queue 235 and change the flag corresponding to the command from logic 1 to logic 0.

For instance, upon receiving the acknowledgement AFC of the first completion response RES1 from the host 100, the device controller 230 may change the flag corresponding to the first command CMD1 from logic 1 to logic 0. In addition, upon receiving the acknowledgement AFC of the second command CMD2 from the host 100, the device controller 230 may change the flag corresponding to the second command CMD2 from logic 1 to logic 0.

The device controller 230 may determine whether processing corresponding to the last command received from the host 100 has been completed based on a bit value of each flag stored in the command queue 235. In other words, when the bit value of every flag is logic 0, the device controller 230 may determine that the processing corresponding to the last command received from the host 100 has been completed.

Alternatively, the device controller 230 may determine whether there is any command to be executed based on the command queue 235. In other words, when the command queue 235 is empty, the device controller 230 may determine that there is no command to be executed at present. When the device controller 230 determines that the processing corresponding to the last command received from the host 100 has been completed or that there is no command to be executed at present, it may provide the determination result for the LINK 220.

The LINK 220 in the storage device 200 may count fillers transmitted from the PHY transmission module 141 of the host 100 to the PHY receiving module 211 of the storage device 200 based on the determination result from the device controller 230 and may generate a count value in operation S150. After transmitting the acknowledgement AFC of the second completion response RES2 to the storage device 200, the PHY transmission module 141 of the host 100 may continuously transmit the fillers FLR to the storage device 200.

The fillers FLR may be generated by the PHY transmission module 141 of the host 100 and transmitted to the PHY receiving module 211 of the storage device 200 through the first link LINK1. The fillers FLR may also be generated by the PHY transmission module 212 of the storage device 200 and transmitted to the PHY receiving module 142 of the host 100 through the second link LINK2.

The counter 225 may count the fillers FLR transmitted from the PHY transmission module 141 of the host 100 to the PHY receiving module 211 of the storage device 200 after data processing corresponding to commands from the host 100 is all completed. For instance, as shown in FIG. 4, after the device controller 230 receives the acknowledgement AFC of the second completion response RES2 corresponding to the second command CMD2, i.e., the last command from the host 100, the counter 225 may count the fillers FLR transmitted from the PHY transmission module 141 of the host 100 to the PHY receiving module 211 of the storage device 200 and generate a count value.

The LINK 220 may compare the count value with the reference value REF in operation S160. The reference value REF may vary with the performance of the host 100 and the storage device 200 or a user's use pattern.

When the count value is equal to or greater than the reference value REF, the LINK 220 may automatically send the deep stall request DSR requesting to stop transmission of any filler to the host in operation S170. In other words, when only fillers are transmitted from the host 100 for a predetermined period of time, the storage device 200 may determine that there is no command to be executed and automatically send the deep stall request DSR to the host 100 through the PHY transmission module 212.

The deep stall request DSR may be an operation of consecutively transmitting an MK2 data pattern defined in the UniPro$^{SM}$ version 1.6 specification a plurality of times. For instance, the reference value REF may be set to 5, as shown in FIG. 5. The counter 225 may count the fillers FLR_1 through FLR_5 received from the host 100 through the PHY receiving module 211 in the storage device 200. When the fifth filler FLR_5 is counted, the counter 225 may consecutively send the MK data pattern two times to the host 100 through the PHY transmission module 212 of the storage device 200 for the deep stall request DSR.

After sending the deep stall request DSR to the host 100, the storage device 200 may cut off power supply to the PHY PLL circuit 215 in operation S180. Accordingly, the storage device 200 may transit from the BURST state to the DEEP STALL state and power consumption of the storage device 200 rapidly decreases.

Upon receiving the deep stall request DSR from the storage device 200, the host 100 may send an acknowledgement of the deep stall request DSR to the storage device 200 through the PHY transmission module 141. For the acknowledgement, the host 100 may consecutively send the MK2 data pattern defined in the UniPro$^{SM}$ version 1.6 specification a plurality of times. After sending the acknowledgement of the deep stall request DSR to the storage device 200, the host 100 may cut off power supply to the PHY PLL circuit 145. The storage device 200 may receive the acknowledgement of the deep stall request DSR through the PHY receiving module 211 and may additionally cut off power supply to the PHY receiving module 211 in operation S190.

Consequently, the host 100 and the storage device 200 may cut off the power to the PHY PLL circuits 145 and 215, respectively, in the idle state where only fillers are transferred between the host 100 and the storage device 200 with no valid data transferred therebetween and they may enter the DEEP STALL state. As a result, power consumption of both the host 100 and the storage device 200 rapidly decreases.

As described above, according to some embodiments of the disclosure, a method of operating a storage device saves power while maintaining the performance at the HS mode of the MIPI M-PHY.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to exemplary embodiments thereof, it will be understood by those of ordinary skill in the art that various changes in forms and details may be made therein without departing from the spirit and scope of the disclosure as defined by the following claims.

What is claimed is:

1. A method of operating a storage device which communicates with a host using a serial interface, the method comprising:
    counting dummy patterns transmitted from a physical layer (PHY) transmission module of the host to generate a count value;
    comparing the count value with a reference value to generate a comparison result;
    cutting off power to a PHY phase locked loop (PLL) circuit of the storage device according to the comparison result; and
    sending the host a deep stall request requesting that the host stops transmission of additional dummy patterns according to the comparison result.

2. The method of claim 1, wherein the deep stall request comprises consecutively sending an MK2 signal, defined in the UniPro$^{SM}$ version 1.6 specification, a plurality of times.

3. The method of claim 1, further comprising:
    receiving an acknowledgement of the deep stall request from the host; and
    cutting off power to a PHY receiving module of the storage device in response to the acknowledgement.

4. The method of claim 3, wherein the acknowledgement comprises consecutively receiving an MK2 signal, defined in the UniPro$^{SM}$ version 1.6 specification, a plurality of times.

5. The method of claim 1, further comprising:
    sending the host a completion response indicating that data processing corresponding to a command received from the host has been completed;
    receiving an acknowledgement of the completion response from the host; and
    determining whether the acknowledgement is related with a last command received from the host.

6. The method of claim 1, further comprising determining whether a command queue is empty before generating the count value, wherein the storage device comprises the command queue configured to store commands that have not been executed among commands received from the host.

7. The method of claim 1, further comprising setting the reference value.

8. The method of claim 1, wherein the comparing is performed in a link layer of the storage device.

9. The method of claim 1, wherein the serial interface is one selected from the group consisting of a universal flash storage (UFS) interface, a peripheral component interconnect express (PCIe) interface, a non-volatile memory express (NVMe) interface, a serial advanced technology attachment (SATA) interface, and a serial attached SCSI (small computer system interface) (SAS).

10. A method of operating a data processing system including a host and a storage device which communicate with each other using a serial interface, the method comprising:

the host sending dummy patterns to the storage device;

the storage device counting the dummy patterns to generate a count value;

the storage device comparing the count value with a reference value;

the storage device cutting off power to a physical layer (PHY) phase locked loop (PLL) circuit of the storage device according to the comparison result; and the storage device sending the host a deep stall request requesting the host to stop transmission of additional dummy patterns according to the comparison result.

11. The method of claim 10, further comprising the host cutting off power to a PHY PLL circuit of the host in response to the deep stall request.

12. The method of claim 10, further comprising:

the host sending an acknowledgement of the deep stall request to the storage device; and the storage device cutting off power to a PHY receiving module of the storage device in response to the acknowledgement.

13. The method of claim 10, further comprising the storage device determining whether a command queue is empty before generating the count value, wherein the storage device comprises the command queue configured to store commands that have not been executed among commands received from the host.

14. A method executed by a nonvolatile memory storage device that communicates with a host using a serial interface, the method comprising:

determining, in a first determination, whether the host has acknowledged a response from the storage device pertaining to a last command received from the host;

determining, in a second determination, whether the host has no further command to communicate to the storage device; and withdrawing power to a phase-locked loop circuit of a physical-layer (PHY) transmission module of the storage device when both the first and second determinations are affirmative.

15. The method of claim 14, wherein the second determination is affirmative when the storage device receives a predetermined number of dummy patterns after having received the acknowledgment to the response from the storage device pertaining to the last command received from the host.

16. The method of claim 14, further comprising:

communicating, when both the first and second determinations are affirmative, a request to the host to discontinue transmitting a dummy pattern; and withdrawing power to a PHY receiving module of the storage device in response to receiving an acknowledgment to the request from the host.

17. The method of claim 14, wherein the storage device executes the method when operating in a high-speed communication mode defined by the mobile industry processor interface (MIPI) standard.

18. The method of claim 15, wherein the predetermined number varies in accordance with a user's use pattern of the storage device.

* * * * *